(12) United States Patent
Yoshida et al.

(10) Patent No.: US 6,275,662 B1
(45) Date of Patent: Aug. 14, 2001

(54) FILM CARTRIDGE LOADER FOR CAMERA

(75) Inventors: Hitoshi Yoshida, Hachioji; Yukihiko Sugita, Kokubunji, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/329,986

(22) Filed: Jun. 10, 1999

(30) Foreign Application Priority Data

Jun. 23, 1998 (JP) .................................................. 10-176233
Sep. 11, 1998 (JP) .................................................. 10-258734

(51) Int. Cl.[7] .............................. G03B 1/00; G03B 17/02
(52) U.S. Cl. ............................................ 396/408; 396/538
(58) Field of Search .................................. 396/387, 406, 396/407, 408, 511, 513, 515, 516, 536, 538

(56) References Cited

U.S. PATENT DOCUMENTS 5,481,325 * 1/1996 Wada et al. ........................... 396/538
5,943,522 * 8/1999 Ichino .................................. 396/511

FOREIGN PATENT DOCUMENTS 2-248940  10/1990 (JP) .
6-301092  10/1994 (JP) .
8-286269  11/1996 (JP) .

\* cited by examiner

Primary Examiner—David M. Gray
(74) Attorney, Agent, or Firm—Ostrolenk, Faber, Gerb & Soffen, LLP

(57) ABSTRACT

A film cartridge loader for a camera includes a film cartridge chamber having an opening into which a film cartridge can be loaded, a film cartridge chamber lid, a lid locking unit, a lid close detecting unit, an ejecting unit, a film cartridge interceptive door opening/closing unit, a moving unit, a movement detecting unit, a driving source, and a driving control unit. The film cartridge chamber lid is movable for opening or closing the cartridge chamber opening. The lid locking unit locks the film cartridge chamber lid in a closed state. The lid close detecting unit detects that the film cartridge chamber lid is locked by the lid locking unit. The ejecting unit ejects the film cartridge from the film cartridge chamber. The film cartridge interceptive door opening/closing unit opens or closes the interceptive door of the film cartridge. The moving unit moves the ejecting unit responsively to opening actions performed by the film cartridge interceptive door opening/closing unit. The movement detecting unit detects a movement made by the moving unit. The driving source generates driving force by which the film cartridge interceptive door opening/closing unit is driven. The driving control unit controls the driving performed by the driving source in response to an output of the lid close detecting unit and an output of the movement detecting unit.

16 Claims, 13 Drawing Sheets

FILM CARTRIDGE LOADER FOR CAMERA

BACKGROUND OF THE INVENTION

1. Field of the Invention

The present invention relates to a film cartridge loader for a camera. More particularly, this invention is concerned with a film cartridge loader for a camera using a film cartridge. In the film cartridge, a rolled film is stowed. The film cartridge has an interceptive door at the film entrance and exit.

2. Description of the Related Art

In recent years, a novel camera system has generally been adopted in practice for cameras designed for photography or the like. The novel camera system uses a 24 mm wide film that is rolled and stowed in a compact film cartridge.

The film cartridge which is compatible with the novel camera system includes a spool shaft supported so as to be able to freely rotate. A length of film is wound about the spool shaft up to the distal end of the film, whereby the rolled film is stowed in the film cartridge. By rotating the spool shaft, the film is fed from the cartridge or rewound into the cartridge.

The film cartridge has an opening serving as a film entrance and exit. The opening has an interceptive door for preventing invasion of extraneous light into the interior of the film cartridge through the opening. In a normal state, the interceptive door is closed to keep light out of the interior of the film cartridge. For feeding or rewinding the film, the interceptive door is opened by an opening/closing mechanism of the camera. Thus, the film is fed smoothly without any load imposed thereon. When the film is being fed or rewound with the interceptive door open, the film cartridge chamber in the camera in which the film cartridge is loaded must be light tight.

On the other hand, cameras compatible with the novel camera system are designed to reliably hold a film cartridge of the foregoing type and to smoothly feed the film. Correspondingly, the foregoing type of film cartridge is designed to be loaded in a film cartridge chamber in a camera body. Moreover, the above-mentioned types of cameras usually have a film cartridge loader that assists in taking out the film cartridge loaded in the film cartridge chamber.

Various proposals directed to the film cartridge loader have been made in the past and are used in practice.

For example, a camera disclosed in Japanese Unexamined Patent Publication No. 6-301092 has a lid switch and a cartridge switch. The lid switch detects the state of a lid member which is movable for opening or closing a loading opening of a film cartridge chamber. The cartridge switch detects whether or not a film cartridge is fully loaded in the film cartridge chamber. When the cartridge switch has not detected a film cartridge to be loaded in the film cartridge chamber, further actions such as initial film thrusting will not be carried out. This is true even if it is confirmed by the lid switch that the lid member has been closed.

In other words, when it is confirmed by the cartridge switch that a film cartridge has been loaded in the film cartridge chamber, the interceptive door of the film cartridge is opened. Subsequently, actions are performed for feeding the rolled film stowed in the cartridge (initial thrusting actions).

When no film cartridge is loaded in the film cartridge chamber, the actions for feeding a film are not carried out. This feature ensures that unnecessary power will not be consumed.

Moreover, a camera disclosed in Japanese Unexamined Patent Publication No. 8-286269 has an ejecting and indicating member and a switch member. The ejecting and indicating member has the capability to eject a film cartridge loaded in a film cartridge chamber and to indicate a film cartridge-loading state. The switch member is turned on or off responsively to a change in the position of the ejecting and indicating member. The loading state can be discerned externally to see if a film cartridge has been loaded in the film cartridge chamber. Moreover, a signal is generated when the loading of a film cartridge is completed.

This provides the advantage that the loading state can be sensed reliably as to whether a film cartridge has been loaded in the film cartridge chamber.

Furthermore, a film cartridge loading mechanism is described in Japanese Unexamined Patent Publication No. 2-248940. In the disclosed film cartridge loading mechanism, when a film cartridge has been fully loaded in the film cartridge chamber of a camera, if the lid member is closed, the interceptive door of the film cartridge is opened. Using the lid member, a loading opening of the chamber is opened or closed.

In this case, after the actions for closing the lid member are completed, the interceptive door of the film cartridge is opened. The interior of the film cartridge can therefore be reliably protected from light.

According to the camera disclosed in Japanese Unexamined Patent Publication No. 6-301092, when it is confirmed by the cartridge switch that a film cartridge has been loaded in the film cartridge chamber, film feeding actions are performed. The film feeding actions are performed irrespective of the state of the interceptive door of the film cartridge. For example, the interceptive door of the film cartridge may not be fully opened for reasons deriving from failure or the like. Even in this case, the camera may presumably attempt to carry out initial film thrusting actions. In this case, the film may not be able to be fed from the film cartridge, or smooth feeding maybe hindered. Eventually, the camera may malfunction.

Moreover, the camera disclosed in Japanese Unexamined Patent Publication No. 8-286269 is intended to make it possible to externally discern whether a film cartridge has been loaded in the film cartridge chamber. Even when it is confirmed that a film cartridge has been loaded in the film cartridge chamber, no mention is made of subsequent actions a camera should perform. Additionally, the interceptive door of the loaded film cartridge is not described. The presence or absence of a film cartridge and any relationship of the disclosed invention to actions for opening or closing the interceptive door are also not described.

According to the camera disclosed in Japanese Unexamined Patent Publication No. 2-248940, the mechanism for opening the interceptive door of a film cartridge is actuated responsively to actions for closing the lid member. In this reference, the mechanism is actuated irrespective of whether a film cartridge is present in the film cartridge chamber (loading state). In other words, even when no film cartridge is loaded in the film cartridge chamber, if the lid member is closed, the mechanism for opening the interceptive door is actuated. This poses a problem in that unnecessary actions are carried out which eventually wastes power.

Moreover, the film cartridge loading mechanism described in the patent publication mechanically opens or closes the interceptive door of a film cartridge responsively to actions performed for loading the film cartridge in the film cartridge chamber. No mention is made, however, of the inclusion of switches or the like, or of electrical control of relevant series of actions.

SUMMARY OF THE INVENTION

An object of the present invention is to provide a film cartridge loader for a camera in which a film cartridge having an interceptive door is loaded for use. A series of film loading actions is controlled in order to reliably prevent light from entering the interior of the film cartridge, and to ensure more reliable and smooth film feeding actions. Moreover, driving is controlled efficiently in order to save power.

Briefly, a film cartridge loader for a camera in accordance with the present invention comprises a film cartridge chamber, a film cartridge chamber lid, a lid locking means, a lid closure detecting means, an ejecting means, a film cartridge interceptive door opening/closing means, a moving means, a movement detecting means, a driving source, and a driving control means. When a film cartridge is to be loaded in the film cartridge chamber of the present invention, the film cartridge chamber lid is moved for opening or closing an opening through which the film cartridge is loaded in the film cartridge chamber. The lid locking means locks the film cartridge chamber lid in a closed state. The lid closure detecting means detects that the film cartridge chamber lid has been locked by the lid locking means. The ejecting means ejects the film cartridge from the film cartridge chamber. The film cartridge interceptive door opening/closing means opens or closes the interceptive door of the film cartridge. The moving means moves the ejecting means responsively to the opening actions performed by the film cartridge interceptive door opening/closing means. The movement detecting means detects movement caused by the moving means. The driving source generates a driving force with which the film cartridge interceptive door opening/closing means is driven. The driving control means controls the driving force generated by the driving source in response to an output of the lid closure detecting means and an output of the movement detecting means.

These and other objects and advantages of the present invention will become apparent from the description made below.

According to the present invention, there is provided a film cartridge loader for a camera in which a film cartridge having an interceptive door is loaded for use. Herein, a series of film loading actions is controlled in order to reliably prevent light from entering the interior of the film cartridge, and to ensure more reliable and smooth film feeding actions. Additionally, driving is controlled efficiently in order to save power.

DESCRIPTION OF THE PREFERRED EMBODIMENTS

A camera having a film cartridge loader of this embodiment forms the novel camera system of the present invention. The camera uses a film cartridge 100 that is compatible with the system (see FIG. 16) (film cartridge IX240). A rolled film stowed in the film cartridge 100 is used for photography.

Figure 16:
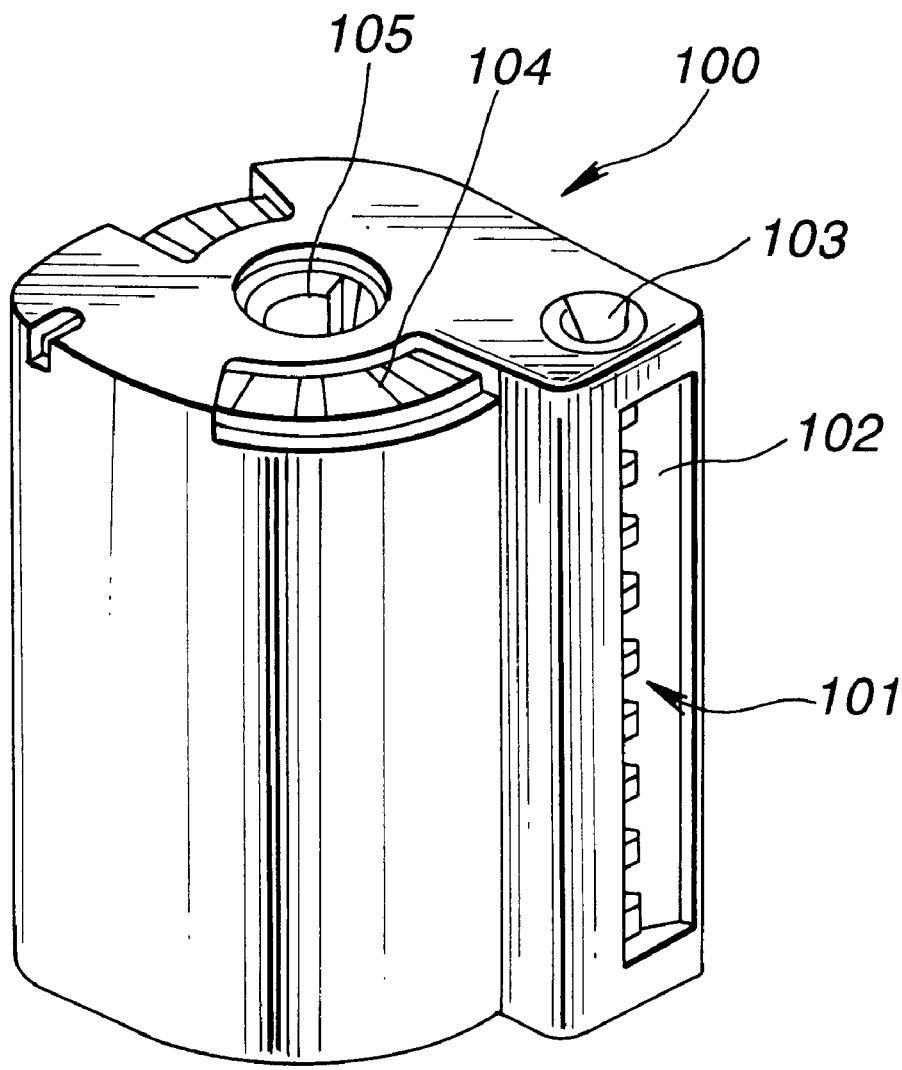
FIG. 16 is a schematic oblique view showing a film cartridge in which a rolled film compatible with the camera shown in FIG. 1 is stowed.

The structure of a film cartridge to be used in a camera which includes the film cartridge loader of the present invention will be described briefly in conjunction with FIG. 16.

The film cartridge 100 has a rolled film stowed therein that is compatible with the novel camera system described herein. As shown in FIG. 16, the film cartridge 100 comprises an interceptive door 102, an open/close shaft portion 103, a bar-code plate 104, and a spool shaft 105. The interceptive door 102 is movable to open or close a cartridge opening 101 serving as an entrance and exit for the film, and intercepts light that would otherwise enter the interior of the film cartridge. The open/close shaft portion 103 has a mechanism for opening or closing the interceptive door 102. The bar code plate 104 has various kinds of information recorded thereon concerning the film, which is stowed in the film cartridge 100. The spool shaft 105 is disposed in the film cartridge 100 so that the spool shaft 105 can be rotated freely. A rolled film is wound about the spool shaft 105.

The film cartridge 100 is loaded in the film cartridge chamber 1 of a camera (see FIG. 1) (hereinafter a cartridge chamber). The camera can now carry out photographic actions due to the operation of the film cartridge loader.

Specifically, the film cartridge loader of this embodiment reliably loads the film cartridge 100 in the cartridge chamber 1 and enables smooth film feeding. In addition, the film cartridge loader makes it possible to easily extract the film cartridge 100 loaded in the cartridge chamber 1. The structure of the film cartridge loader will now be described below in conjunction with FIGS. 1 through 7.

FIGS. 1 through 7 show the members relevant to the present invention which are included in an internal mechanism of a camera in which the film cartridge loader of this embodiment is incorporated.

The film cartridge loader of this embodiment comprises, as shown in FIGS. 1 through 7, a plurality of members arranged on the outer wall portions of the cartridge chamber 1, which forms an integral part of the camera body. The outer wall portions include the sidewall 1y and top 1x of the cartridge chamber 1.

Figure 1:
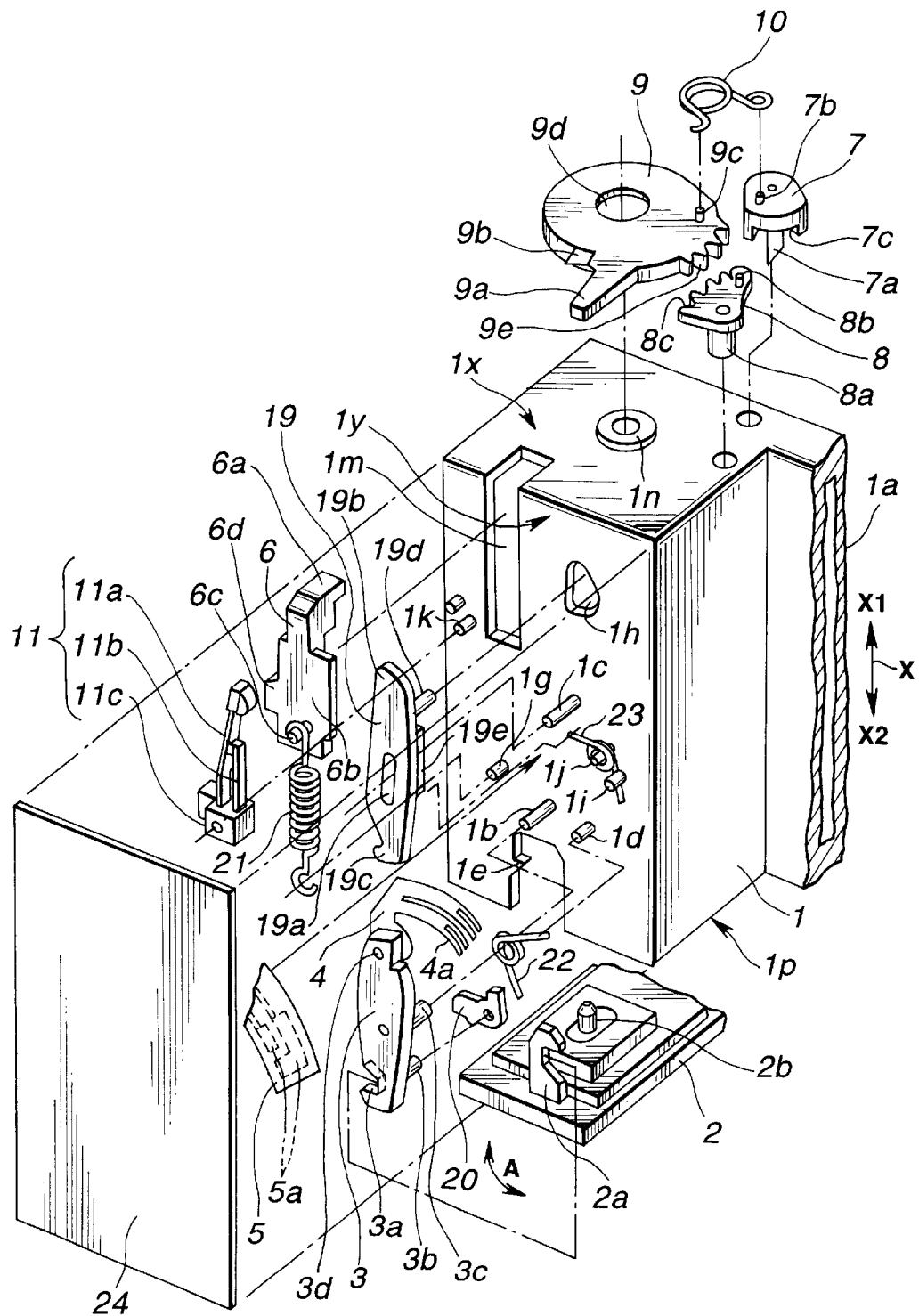
FIG. 1 is an exploded oblique view of a film cartridge loader in accordance with an embodiment of the present invention.
Figure 3:
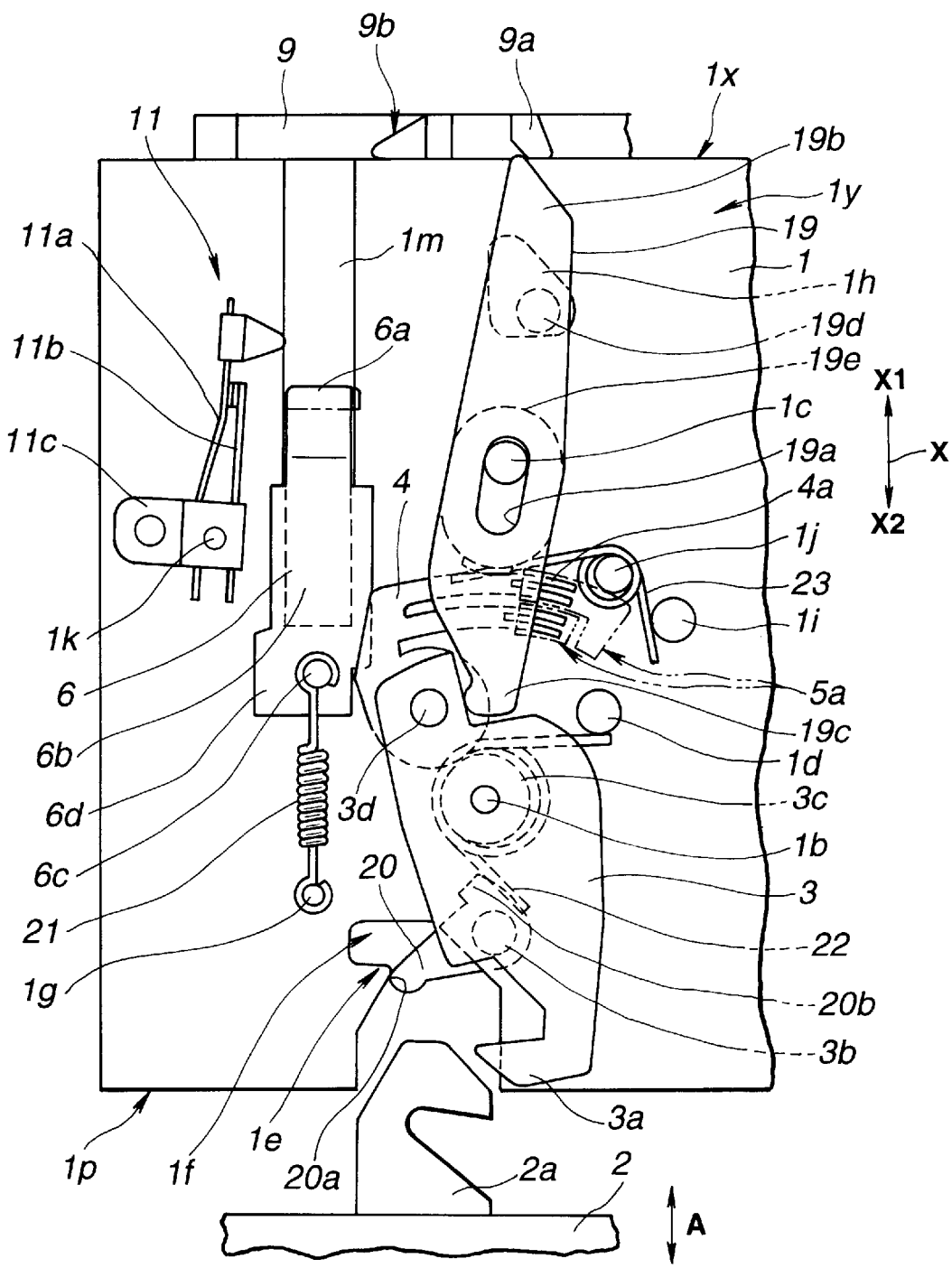
FIG. 3 is a front view of the film cartridge loader shown in FIG. 1, wherein a film cartridge has been almost fully loaded in the film cartridge chamber and the film cartridge chamber lid has been opened.

Specifically, an opening 1p through which the film cartridge 100 is inserted or removed is bored in the bottom of the cartridge chamber 1. A film cartridge chamber lid (hereinafter, simply, a chamber lid) 2 serving as a lid member to be moved for opening or closing the opening 1p is attached to a locking member in the camera body (not shown). The chamber lid 2 can pivot freely in directions of arrow A as shown in FIG. 1 and FIG. 3. The chamber lid 2 has a lock portion 2a and a spindle 2b (see FIG. 1). The lock portion 2a is shaped like a hook and serves as a chamber lid lock member for locking the lid 2 in a closed state. The spindle 2b engages with the spool shaft 105 of the film cartridge 100 to be stowed in the cartridge chamber 1 when the lid 2 is closed. The spindle 2b supports the spool shaft so that the spool shaft can rotate freely. The spindle 2b is located at a predetermined position such that when the chamber lid 2 is closed, the spindle 2b will be opposed to one end surface of the film cartridge 100 stowed in the cartridge chamber 1.

Moreover, the lock portion 2a is formed at a position such that when the chamber lid 2 is closed, the lock portion will be located at a predetermined position along the sidewall 1y of the cartridge chamber 1. In other words, the lock portion 2a is provided at a position at which it will be opposed to a lock member (lock lever 3) which will be described later.

The lock lever 3 which serves as a lock member for holding the chamber lid 2 closed is positioned on the sidewall 1y of the cartridge chamber 1. The lock lever 3 has a cylindrical supporting portion 3c positioned substantially in the center thereof and opposed to the sidewall 1y of the cartridge chamber 1. A spindle 1b implanted in the sidewall 1y of the cartridge chamber 1 at a predetermined position on the sidewall is fitted into the supporting portion 3c. Consequently, the lock lever 3 can freely turn with the spindle 1b as a center. A hook portion 3a for locking the lock portion 2a is formed near the distal end (lower end in FIG. 1) of one arm of the lock lever 3. In other words, the lock portion 2a of the chamber lid 2 and the hook portion 3a of the lock lever 3 become engaged with each other for locking the chamber lid 2 in a closed state.

Moreover, an axis 3b is implanted in the lock lever 3 near the hook portion 3a and oriented towards the sidewall 1y of the cartridge chamber 1. A latch lever 20 is supported by the axis 3b so that it can pivot freely.

A constraining spring 22 is wound about the outer circumference of the supporting portion 3c of the lock lever 3. One end of the constraining spring 22 abuts on a locking axis 1d of the cartridge chamber 1, and the other end thereof abuts an abutment portion 20b (see FIG. 3) of the latch lever 20. Due to the constraining force exerted by the constraining spring 22, the lock lever 3 is constrained to move clockwise (see FIG. 3) with the supporting portion 3c (spindle 1b) as a center.

The distal end of arm 20a of the latch lever 20 abuts a projecting part 1e of the sidewall 1y of the cartridge chamber 1. The lock lever 3 and latch lever 20 are thus positioned against the force of the constraining spring 22. In this state (state shown in FIG. 3), the lock portion 2a and hook portion 3a are restrained from engaging with each other. Thus, the lock portion 2a and hook portion 3a are held disengaged from each other.

An axis 3d (see FIG. 3) is implanted in the other end (upper end in FIG. 1) of the lock lever 3 and oriented in the same direction as the axis 3b. A chip 4 is fixed to the axis 3d. An electrical contact 4a formed on the chip 4 is conformable to a switch pattern 5a (see FIG. 1) provided on a printed-circuit board 5 fixed in the camera. The chip 4 turns as the lock lever 3 turns. The electrical contact 4a and switch pattern 5a will either meet each other or part from each other depending on the turning actions performed by the lock lever 3, and thereby serves as a switching means. The switching means is capable of functioning as a detecting means for detecting when the chamber lid 2 is closed and is also capable of functioning as a switch which serves as a chamber lid open/close detection member.

Moreover, a rectangular guide groove 1m is bored at a predetermined position in the sidewall 1y of the cartridge chamber 1. The predetermined position ranges from a position on the sidewall 1y near the top 1x of the cartridge chamber 1 to the perimeter of the top 1x. A short arm portion 6a of a cartridge ejecting member 6, which is shaped substantially like the letter "L" (hereinafter, simply, an ejecting member), is inserted into the guide groove 1m so that the short arm portion can slide freely therein. The ejecting member 6 is an ejecting means for ejecting a film cartridge 100 loaded in the cartridge chamber 1. The ejecting member 6 is guided along the guide groove 1m so that it can freely slide in the directions of arrow X in FIG. 1 and FIG. 3.

Moreover, the tip of the short arm portion 6a of the ejecting member 6 slightly protrudes into the cartridge chamber 1. When the film cartridge 100 is loaded in the cartridge chamber 1, an end surface of the film cartridge 100 abuts the short arm portion 6a. Hence, the ejecting member 6 is moved in the direction of arrow X1 in FIG. 1 and FIG. 3 in response to actions performed during loading the film cartridge 100 in the cartridge chamber 1. The components surrounding the short arm portion 6a of the ejecting member 6 will be described later.

A locking axis 6c is implanted in a long arm portion 6b of the ejection member 6 near the distal end of the long arm portion, and is oriented outwardly relative to the sidewall 1y of the cartridge chamber 1. One end of constraining spring 21, which is a taut coil spring, is locked on the locking axis 6c. The other end of the spring 21 is locked on a locking axis 1g on the sidewall 1y. The ejection member 6 is therefore biased in the direction of arrow X2 in FIG. 1 and FIG. 3 due to the constraining force of the constraining spring 21.

A step portion 6d is formed as a side edge of the lower part of the long arm portion 6b of the ejection member 6. When the ejection member 6 moves in the directions of arrow X, the step portion 6d operates a film cartridge load detection switch (hereinafter, a cartridge load detection switch) 11 to be described later. In this manner, the switch 11 is opened or closed.

An interceptive door open/close member that serves a film cartridge interceptive door opening/closing means is located at the top 1x of the cartridge chamber 1. The interceptive door open/close member is composed of an open/close fork member 7, a fork spring 10, and a fork drive member 8 (FIGS. 1, 2, 4, and 6).

The fork drive member 8 is shaped substantially like a sector. A spindle 8a is fixed to the proximal side of the fork drive member 8 and oriented downwardly. A gear portion 8c is formed on the outer circumference of the fork drive member. A pin 8b is implanted in the fork drive member 8 at the edge of the gear portion 8c, and oriented upwardly. The spindle 8a is fitted into a hole bored in the top 1x of the cartridge chamber 1, such that the fork drive member 8 is supported so that it can turn freely.

A motor 12 (see FIG. 2) serving as a driving source is connected to the fork drive member 8 via a driving force conveying means (not shown) such as a gear train. The fork drive member 8 is turned with the driving force exerted by the motor 12.

The open/close fork member 7 is located near the fork drive member 8 and is also shaped substantially like a sector. A spindle 7a is fixed to the proximal side of the open/close fork member 7 and is oriented downwardly. The tip of the spindle 7a protrudes into the interior of the cartridge chamber 1 near the opening 1a which serves as a film entrance and exit. The spindle 7a supports the open/close fork member 7 so that the open/close fork member 7 can turn freely. The spindle 7a is fitted into the open/close shaft portion 103 of the interceptive door 102 of the film cartridge 100 when it is loaded into the cartridge chamber 1. When the spindle 7a (open/close fork member 7) rotates, the open/close shaft portion 103 rotates, which causes the interceptive door 102 to open or close. A film may then be fed through the opening 101 of the film cartridge.

A substantially triangular guide groove portion 7c is formed as part of the bottom of the open/close fork member 7. The pin 8b of the fork drive member 8 is engaged with the guide groove portion 7c. When the fork drive member 8 is turned with the driving force of the motor 12, the pin 8b moves along the inner circumference of the guide groove 7c, which causes the open/close fork member 7 to turn. The interceptive door 102 of the film cartridge 100 loaded in the cartridge chamber 1 is opened or closed with the turning of the open/close fork member 7.

A gear portion 9e is formed as part of the outer circumference of a cam ring 9 and is meshed with the gear portion 8c of the fork drive member 8. The cam ring 9 has an arm portion 9a protruding outwardly at a predetermined position on the outer circumference thereof. Moreover, the cam ring 9 also has an inclined plane 9b formed on the stem of the arm portion 9a. An engagement hole 9d is bored substantially in the center of the cam ring 9, and is engaged with a supporting portion in formed substantially in the center of the top 1x of the cartridge chamber 1 so that the cam ring 9 can turn freely thereon.

An upwardly oriented pin 9c is implanted in the cam ring 9 near the gear portion 9e on the perimeter of the cam ring 9. One end of a fork spring 10 which is a toggle spring, is locked on the pin 9c. The other end of the fork spring 10 is locked on the pin 7b implanted in the open/close fork member 7 on the perimeter of the open/close fork member 7.

Figure 2:
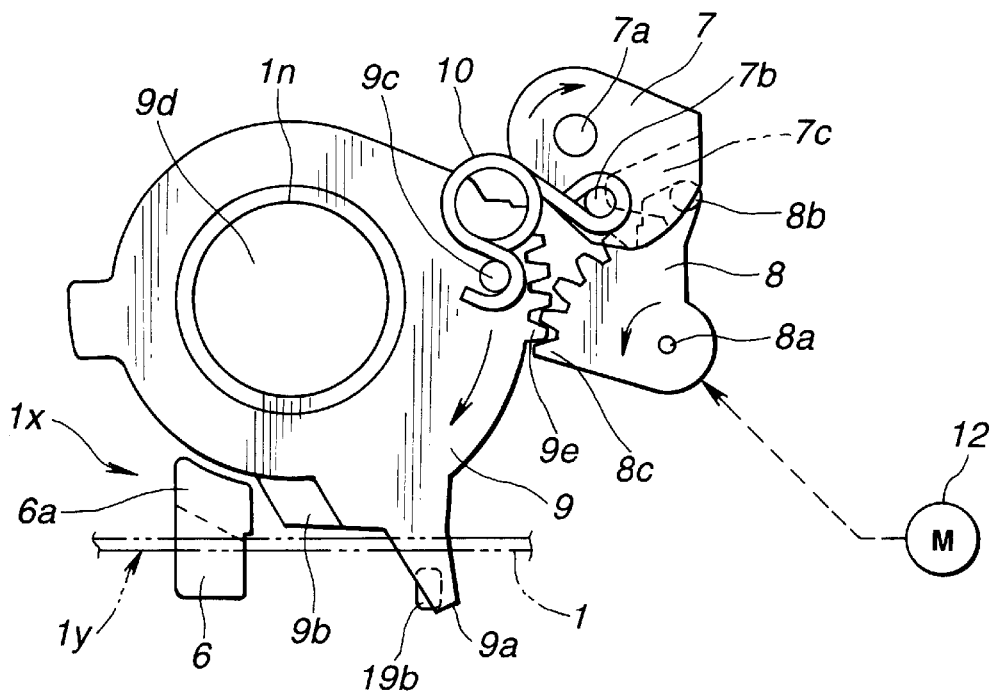
FIG. 2 is a top view of a film cartridge interceptive door opening/closing means and integral parts of the film cartridge loader shown in FIG. 1 as viewed from above the film cartridge chamber, wherein a film cartridge has been almost fully loaded in the film cartridge chamber and the film cartridge chamber lid has been opened.

The fork spring 10, in the state shown in FIG. 2, constrains the open/close fork member 7 to move in a counterclockwise direction (the direction in which the interceptive door is closed). When the fork driving member 8 is turned in the counterclockwise direction, the open/close fork member 7 is turned clockwise against the constraining force exerted by the fork spring 10. When the open/close fork member 7 passes through a predetermined position, the constraining force of the fork spring 10 works to cause the open/close fork member 7 to turn in the direction in which the interceptive door is opened (clockwise, in the example embodiment shown in FIG. 6).

Since the gear portion 8c and gear portion 9e are meshed with each other, the cam ring 9 turns clockwise as viewed in FIG. 2 along with a counterclockwise turn made by the fork drive member 8. At this time, the inclined plane 9b of the cam ring 9 operates on the short arm portion 6a of the ejection member 6, so as to push up the ejection member 6. These actions will be further described in conjunction with FIGS. 8 through 10.

Figure 10:
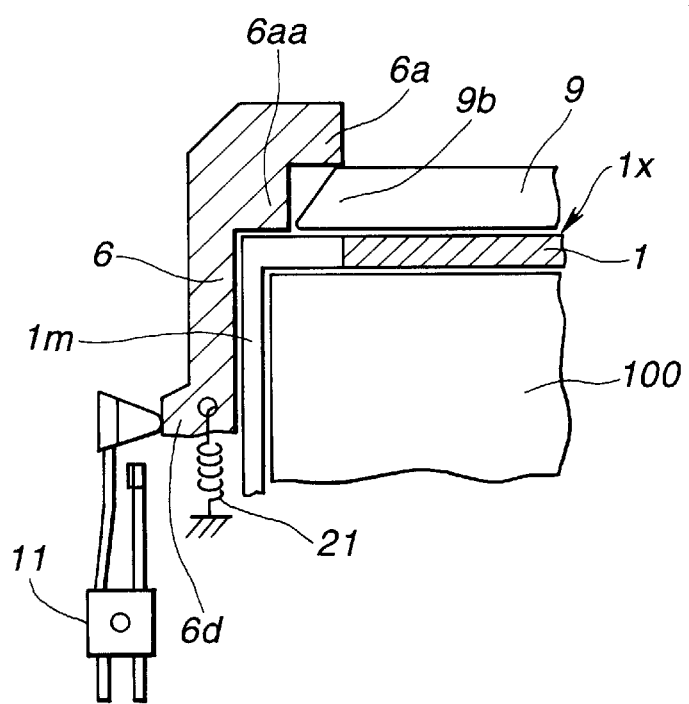
FIG. 10 is a conceptual diagram showing the ejection member and the major components located near the ejection member in the film cartridge loader shown in FIG. 1, wherein a film cartridge has been loaded in the film cartridge chamber and the film cartridge chamber lid is fully closed.
Figure 8:
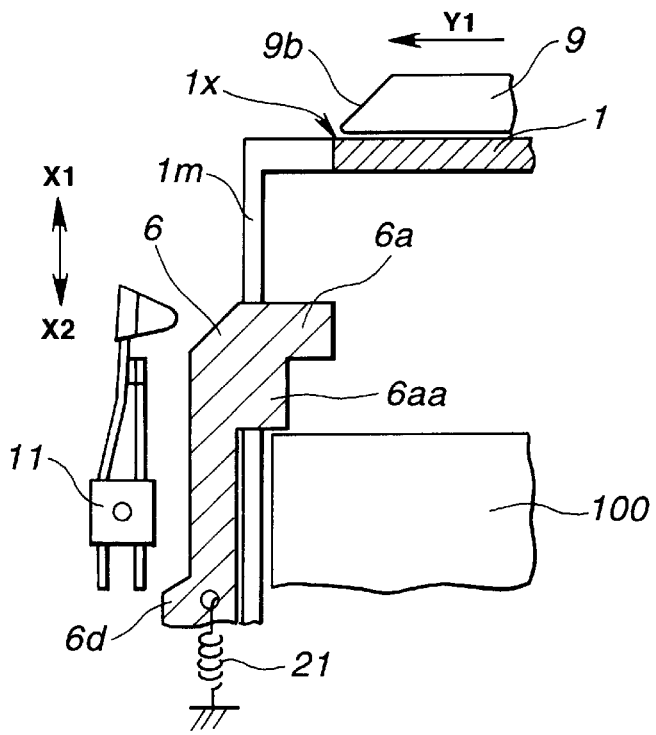
FIG. 8 is a conceptual diagram showing an ejection member and major components located near the ejection member in the film cartridge loader shown in FIG. 1, wherein a film cartridge is being loaded in the film cartridge chamber.
Figure 9:
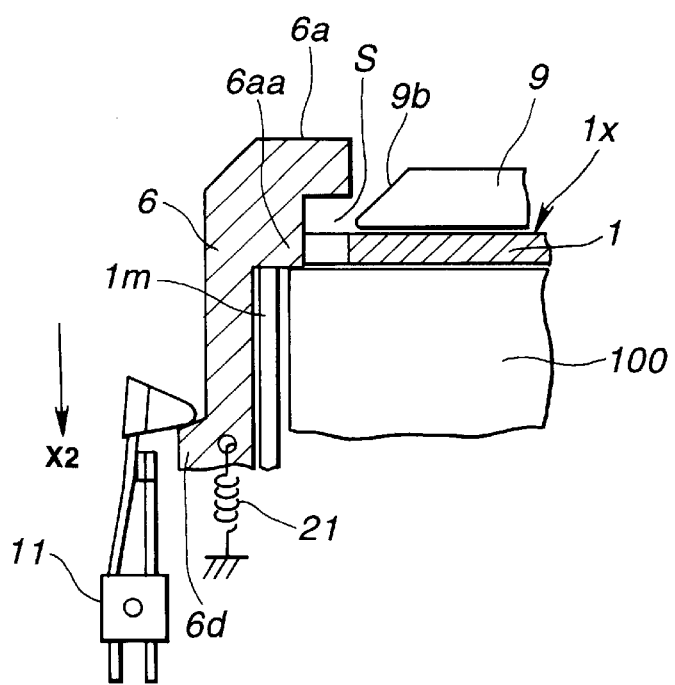
FIG. 9 is a conceptual diagram showing the ejection member and the major components located near the ejection member in the film cartridge loader shown in FIG. 1, wherein a film cartridge has been loaded in the film cartridge chamber and the film cartridge chamber lid is almost fully closed.

After the film cartridge 100 is loaded in the cartridge chamber 1, a series of actions are carried out for closing the chamber lid 2. The actions are schematically illustrated in FIG. 8 through FIG. 10, in which a section of the distal part of the ejection member 6 is shown. FIG. 8 through FIG. 10 conceptually show the positional relationships among such components as the ejection member 6, cartridge chamber 1, film cartridge 100, and cam ring 9. The various positional relationships are established when the film cartridge 100 is loaded in the cartridge chamber 1. Note that the locations and shapes of the components may differ slightly from those of the components of this embodiment as shown in FIG. 1 through FIG. 7.

The state shown in FIG. 8 is a state in which the film cartridge 100 is beginning to be loaded in the cartridge chamber 1. An abutment portion 6aa having a stepped section is located near the short arm portion 6a of the ejection member 6. The short arm portion 6a of the ejection member 6 is, as mentioned previously, inserted in the guide groove 1m bored in the sidewall 1y (see FIG. 1 and FIG. 3) of the cartridge chamber, so that the short arm portion 6a can slide freely. It is noted that, the short arm portion 6a and abutment portion 6aa both protrude into the cartridge chamber 1.

As shown in FIG. 8, the actions performed for loading the film cartridge 100 cause an end surface of the film cartridge 100 to abut an abutment surface located on the lower surface of the abutment portion 6aa. As the film cartridge 100 is pushed down, the ejection member 6 is caused to slide in the direction of arrow X1. The ejection member 6 is in turn pushed upward until the end surface of the film cartridge 100 abuts on the ceiling surface of the cartridge chamber so that the ejection member 6 stops moving, as shown in FIG. 9. At this time, the ejection member 6 is biased in the direction of arrow X2 due to the constraining force of the constraining spring 21. As can be seen in FIG. 9, a gap S is created between the lower surface of the short arm portion 6a of the ejection member 6 and the upper surface 1x of the cartridge chamber 1.

In this state, when the cam ring 9 moves, the inclined plane 9b of the cam ring 9 enters the gap S. The ejection member 6 is therefore pushed further upward to the state shown in FIG. 10. When the cam ring 9 stops moving in this state, the ejection member 6 is locked in place.

In FIG. 8 through FIG. 10, the inclined plane 9b of the cam ring 9 is shown to slide in the direction of arrow Y1 in FIG. 8. The inclined plane 9b enters the gaps S when the cam ring 9 turns in response to a turn made by the fork drive member 8. Consequently, the ejection member 6 is pushed up. The operation of the cam ring 9 and the operation of the cartridge load detection switch 11 shown in FIG. 8 through FIG. 10 will be described later. Briefly stated, these operations constitute switch opening/closing actions responsive to movements in the directions of arrow X made by the ejection member 6.

Referring back to FIG. 1 through FIG. 7, the cartridge load detection switch 11 is locked near the ejection member 6 by a locking member 1k on the sidewall 1y of the cartridge chamber 11 (see FIG. 1 and FIG. 3). The cartridge load detection switch 11 serves as a movement detecting means (movement detection member) or cartridge loading state detecting member for detecting that the cartridge 100 has been reliably loaded in the cartridge chamber 1. The cartridge load detection switch 11 is composed of two terminals 11a and 11b and a locking base 11c for locking the terminals. The two terminals 11a and 11b contact each other in the normal state prior to loading a cartridge.

As described above, the ejection member 6 is moved in the direction of arrow X1 in accordance with the actions associated with loading the film cartridge 100, and is pushed upwardly (moved). At this time, the step portion 6d of the ejection member 6 abuts the distal abutment portion of the terminal 11a of the cartridge load detection switch 11. This causes the terminals 11a and 11b to separate from each other, whereupon the switching state (on or off) of the switch 11 is changed. Specifically, the cam ring 9 moves and pushes up the ejection member 6, and the switching state of the cartridge load detection switch 11 is changed responsively to this action of the cam ring 9. Consequently, it can be detected that the film cartridge 100 has been loaded in the cartridge chamber 1.

A release lever 19 is located at a predetermined position above the lock lever 3 on the sidewall 1y of the cartridge chamber 1. The release lever 19 has an oblong hole 19a in the center thereof. A sleeve portion 19e is formed on the perimeter of the oblong hole 19 and oriented towards the sidewall 1y. The sleeve portion 19e is intended to preserve a gap between the release lever and the sidewall 1y of the cartridge chamber 1 so that the release lever 19 can move smoothly.

A guide pin 1c implanted in the sidewall 1y penetrates through the oblong hole 19a. The release lever 19 is supported by the guide pin 1c so that it can turn freely and slide freely in the directions of arrow X. At the same time, the range of movements in the directions of arrow X that may be made by the release lever 19 is restricted by the guide pin 1c.

A guide pin 19d is implanted in the center of an arm portion 19b of the release lever 19 and oriented towards the sidewall 1y. The guide pin 19d is placed in a substantially triangular guide hole 1h bored in the sidewall 1y of the cartridge chamber 1. This restricts a turning action to be made by the release lever 19.

A constraining spring 23 is located near the release lever 19. A constraining spring 23 is held by a spindle 1j implanted in the sidewall 1y. One end of the constraining spring 23 abuts the locking axis 1i on the sidewall 1y, and the other end thereof abuts the sleeve portion 19e of the release lever 19. The release lever 19 is therefore constrained to move in the direction of arrow X1 in FIG. 1 and FIG. 3 due to the constraining force of the constraining spring 23.

The tip of the arm portion 19b of the release lever 19 extends upward beyond the top 1x of the cartridge chamber 1. The tip of the arm portion 19b is located a position at which it can abut the arm portion 9a of the cam ring 9. On the other hand, the tip of the other arm portion 19c of the release lever 19 is located at a position at which it can abut the other end of the lock lever 3 in the state shown in FIG. 3 (immediately before the chamber lid 2 is closed). In other words, in the state shown in FIG. 3, the position of the upper part of the release lever 19 restricted by the arm portion 9a of the cam ring 9 abutting the tip of the end portion 19b. In addition, the position of the lower part of the release lever 19 is restricted by the other end of the lock lever 3 abutting the tip of the other end portion 19c. However, the release lever 19 does not operate on the cam ring 9 and lock lever 3.

Instead, the release lever 19 fills the role of a lid unlocking means for unlocking the chamber lid 2 when it has been locked by a lid locking means. The lid locking means is composed of the lock portion 2a of the chamber lid 2 and the hook portion 3a of the lock lever 3. When the film cartridge 100 is loaded in the cartridge chamber 1, the tip of the arm portion 19b of the release lever 19 projects slightly in the direction of arrow X1 due to the constraining force of the constraining spring 23 (see FIG. 7).

In this state, in order to extract the film cartridge 100 from the cartridge chamber 1, the motor 12 is driven, whereby the fork drive member 8 is turned with the driving force and the cam ring 9 turns responsively to the turning of the fork drive member 8. At this time, the arm portion 9a of the cam ring 9 operates the tip of the arm portion 19b of the release lever 19 to cause the release lever 19 to unlock the chamber lid 2 as will be described in further detail later.

As shown in FIG. 1, a presser plate 24 is placed on the sidewall 1y of the cartridge chamber 1 so that the presser plate 24 will cover the film cartridge loader.

Next, the configuration of the electrical circuitry used in the film cartridge loader of the embodiment having the foregoing components will be described in conjunction with the wiring diagram of FIG. 11.

Figure 11:
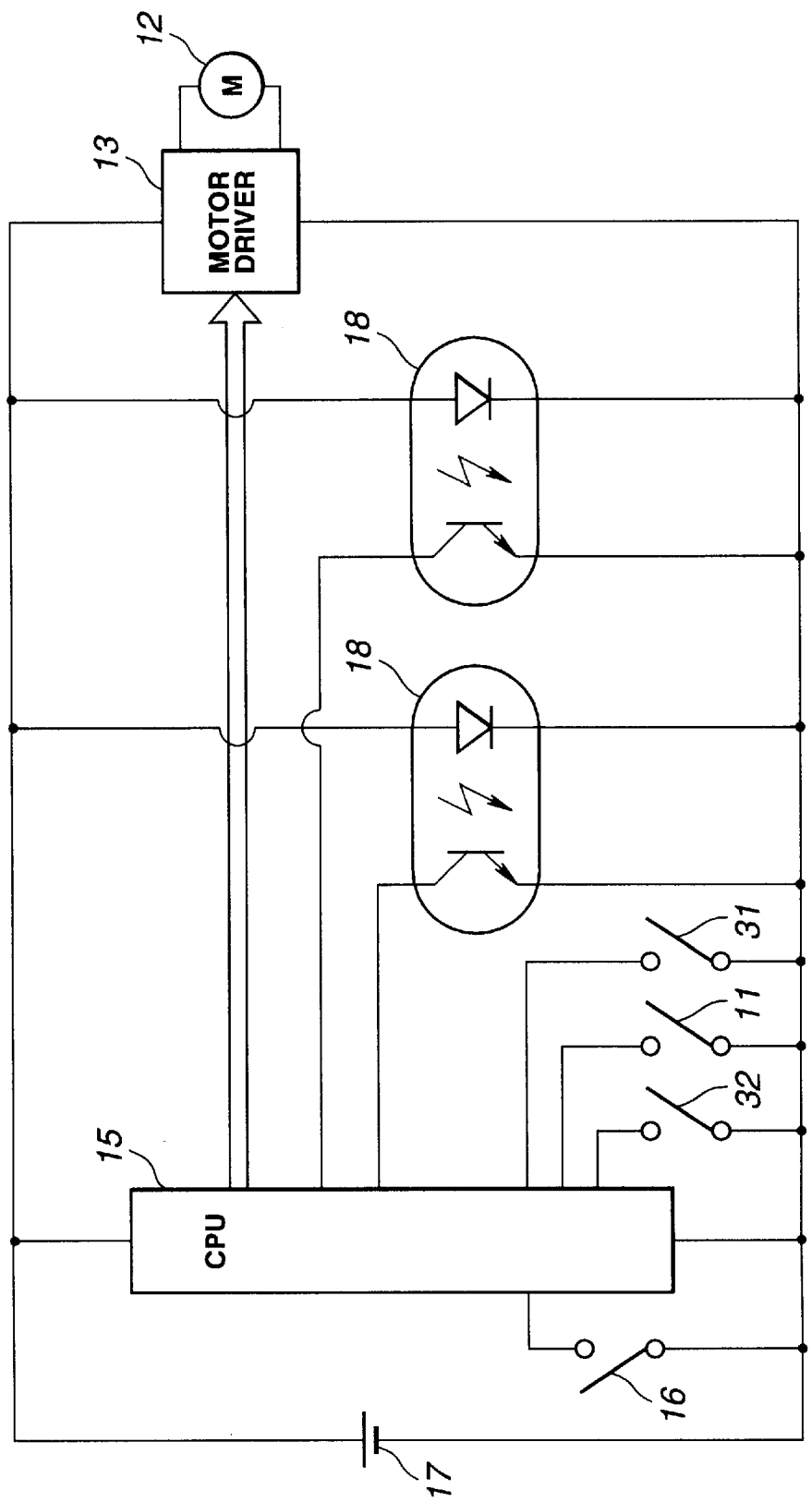
FIG. 11 is a wiring diagram showing the outline configuration of the electrical circuitry relevant to the film cartridge loader shown in FIG. 1.

As shown in FIG. 11, the film cartridge loader of this embodiment has its actions controlled by a CPU 15 serving as a control means for controlling the camera in which the loader of the present invention is incorporated. A power supply 17, a motor driver 13, a lid close detection switch 31, a cartridge load detection switch 11, a film cartridge chamber lid open switch 16, an information reading means 18, and a rewind end detection switch 32 are electrically connected to the CPU 15. The power supply 17 supplies power to the entire camera. The motor driver 13 serves as a driving control means for driving and controlling the motor 12 which serves as a driving source. The lid close detection switch 31 serves as a lid close detecting means and includes the electrical contact 4a and switch pattern 5a. The film cartridge chamber lid open switch (hereinafter, chamber lid open switch) 16 generates a signal for permitting the actions for opening the chamber lid 2 responsively to manipulations performed on a manipulation member which is manipulated in order to open the chamber lid 2. The information reading means 18 is formed with a photo-reflector or the like (not shown), and reads predetermined information from a bar code plate 104 placed on the film cartridge 100 loaded in the cartridge chamber 1. On the bar code plate, information inherent to a film stowed in the cartridge is written. The rewind end detection switch 32 detects completion of rewinding. These electrical members are controlled by the CPU 15.

The chamber lid open switch 16 includes a chamber lid release switch, a halfway rewind switch, and a last frame detection switch. The chamber lid release switch is interlocked with a release button for opening the chamber lid 2. The halfway rewind switch is interlocked with a halfway rewind button that may be manipulated by a camera user for intentionally rewinding a whole exposed part and unexposed part of a film into the film cartridge 100. The last frame detection switch is interlocked with an automatic film rewinding means. The automatic film rewinding means senses the exposure of the last frame of film when photography has been completed for a specified number of exposures, and thereupon permits film rewinding actions. These switches and manipulation members interlocked with the switches constitute a manipulating means for opening the chamber lid 2.

The operation of the film cartridge loader of the embodiment having the foregoing components will now be described in conjunction with FIG. 1 through FIG. 11 and the flowcharts of FIG. 12 and FIG. 13.

For loading the film cartridge 100 in the cartridge chamber 1, first, the chamber lid 2 is opened. At this time, if a film cartridge 100 is not already loaded in the cartridge chamber 1, a desired film cartridge 100 is inserted through the opening 1p along the inner wall of the cartridge chamber.

When the film cartridge 100 is pushed into the cartridge chamber, the end surface of the cartridge 100 abuts the abutment surface of the short arm 6a of the ejection member 6 (see FIG. 8).

From this state, the film cartridge 100 is pushed in further, which causes the ejection member 6 to move in the direction of arrow X1 as shown in FIG. 1 and FIG. 3, against the constraining force of the constraining spring 21. The film cartridge 100 is then pushed further until its end surface abuts the ceiling of the cartridge chamber 1 (see FIG. 9.).

When pushing the film cartridge 100 into the cartridge chamber 1, the actions for closing the chamber lid 2 are normally carried out. Specifically, the inner surface of the chamber lid 2 is abutted the end surface of the film cartridge 100. The chamber lid 2 is then pressed, and the film cartridge 100 is thus pushed into the cartridge chamber 1.

The actions for closing the chamber lid 2 in this case will be described below. First, the chamber lid 2 is moved in the direction of arrow X1 from the state shown in FIG. 3 (the state immediately before the chamber lid 2 is closed). The lock portion 2a then abuts and presses the hook portion 3a. This causes the lock lever 3 to turn in a counterclockwise direction by a small magnitude against the constraining force of the constraining spring 22. The arm portion 20a of the latch lever 20 separates by a small magnitude from the projecting part 1e of the sidewall 1y of the cartridge chamber 1.

The lock portion 2a advances in the direction of arrow X1 while retaining the above state. The distal part of the lock portion 2a then presses the tip of the arm portion 20a of the latch lever 20, causing the latch lever 20 to turn clockwise against the constraining force of the constraining spring 22. As the lock portion 2a further advances in the same direction, the lock lever 3 turns clockwise due to the constraining force of the constraining spring 22 and the lock portion 2a and hook portion 3a no longer abut against each other. The hook portion 3a enters the hook-like part of the lock portion 2a, whereby the lock portion 2a and hook portion 3a become engaged with each other. At the same time, the arm portion 20a of the latch lever 20 passes through the protruding part 1e and enters a groove portion 1f because the arm portion 20a cannot abut the protruding part 1e in this state.

When the lock lever 3 turns clockwise, the chip 4 turns in the same direction which causes the electrical contact 4a on the chip 4 to contact the switch pattern 5a. Consequently, a signal indicating that the chamber lid 2 is closed is generated.

When the lock lever 3 turns clockwise, the other end of the lock lever 3 presses the tip of arm portion 19c of the release lever 19 to cause the release lever 19 to turn counterclockwise. Consequently, the release lever 19 enters the state shown in FIG. 5 in which it lies along the same direction as the axial direction of the cartridge chamber 1. The release lever 19 is pushed up (direction of arrow X1) slightly in this state due to the constraining force of the constraining spring 23. This causes the tip of the arm portion 19b of the release lever 19 to slightly extend beyond the top 1x of the cartridge chamber 1. The tip of the arm portion 19b abuts the arm portion 9a of the cam ring 9, whereby the position of the release lever is restricted (see FIG. 3 and FIG. 4). A series of actions to be performed by the release lever 19 follows the actions to be performed by the lock lever 3.

Owing to the foregoing actions, a signal is generated (step S11 in FIG. 12) by the lid close detection switch 31 (electrical contact 4a and switch pattern 5a). In other words, a signal is generated which indicates that the chamber lid 2 is closed (an off-state signal). In this state, the interior of the cartridge chamber 1 is reliably protected from light. In response to the signal, the camera runs a subroutine entitled Initial Film Thrust (see step S12 in FIG. 12 and FIG. 13).

Figure 12:
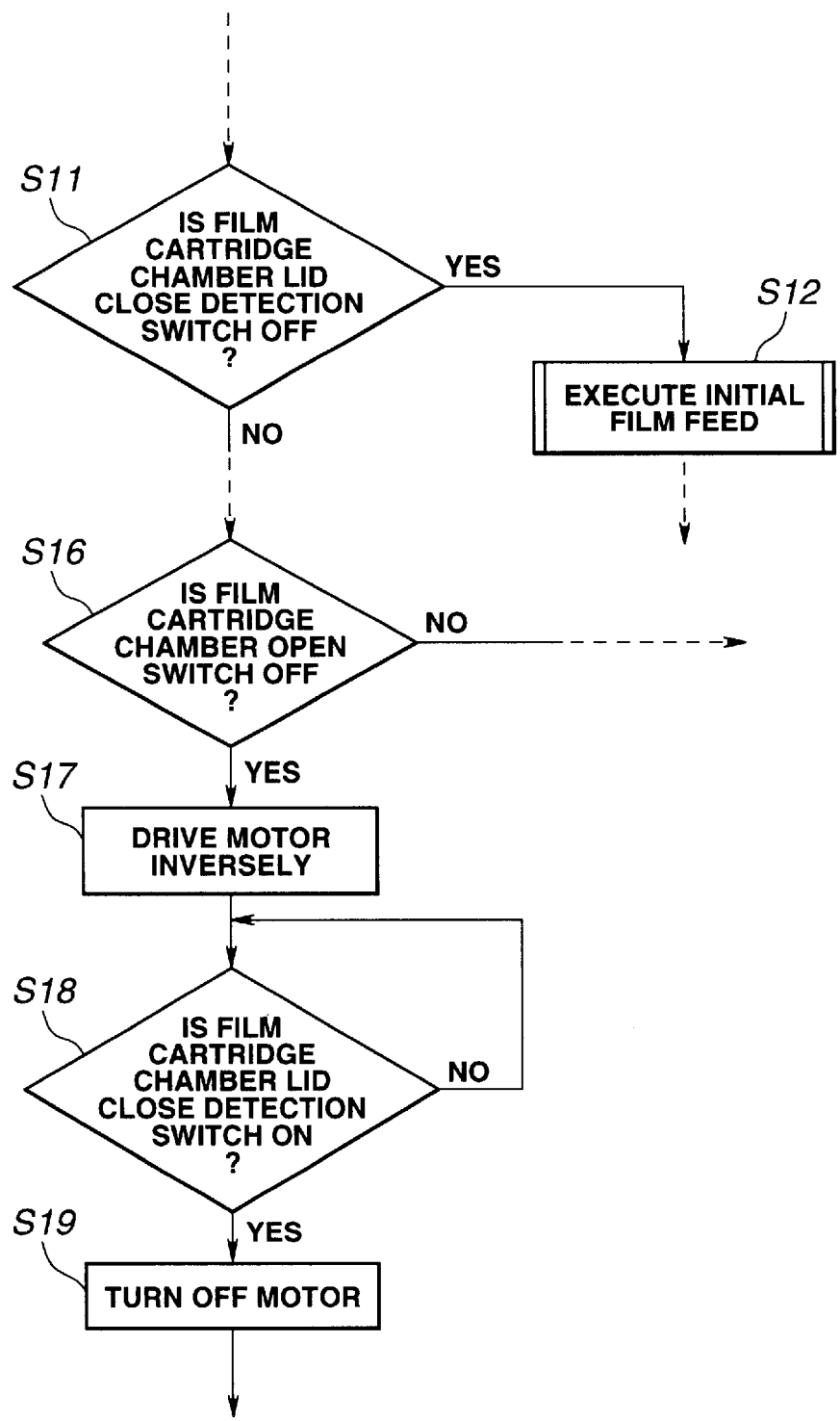
FIG. 12 is a flowchart describing part of a sequence of actions (main routine) which are carried out in a camera in which the film cartridge loader shown in FIG. 1 is incorporated.

To be more specific, at step S11 in FIG. 12, the CPU 15 monitors a signal sent from the lid close detection switch 31. When it is judged that the signal is an off-state signal, control is passed to the subroutine Initial Film Thrust at step S12. In contrast, when it is judged that the signal sent from the lid close detection switch 31 is not the off-state signal, control is passed to subsequent processing (see S16 in FIG. 12).

Figure 13:
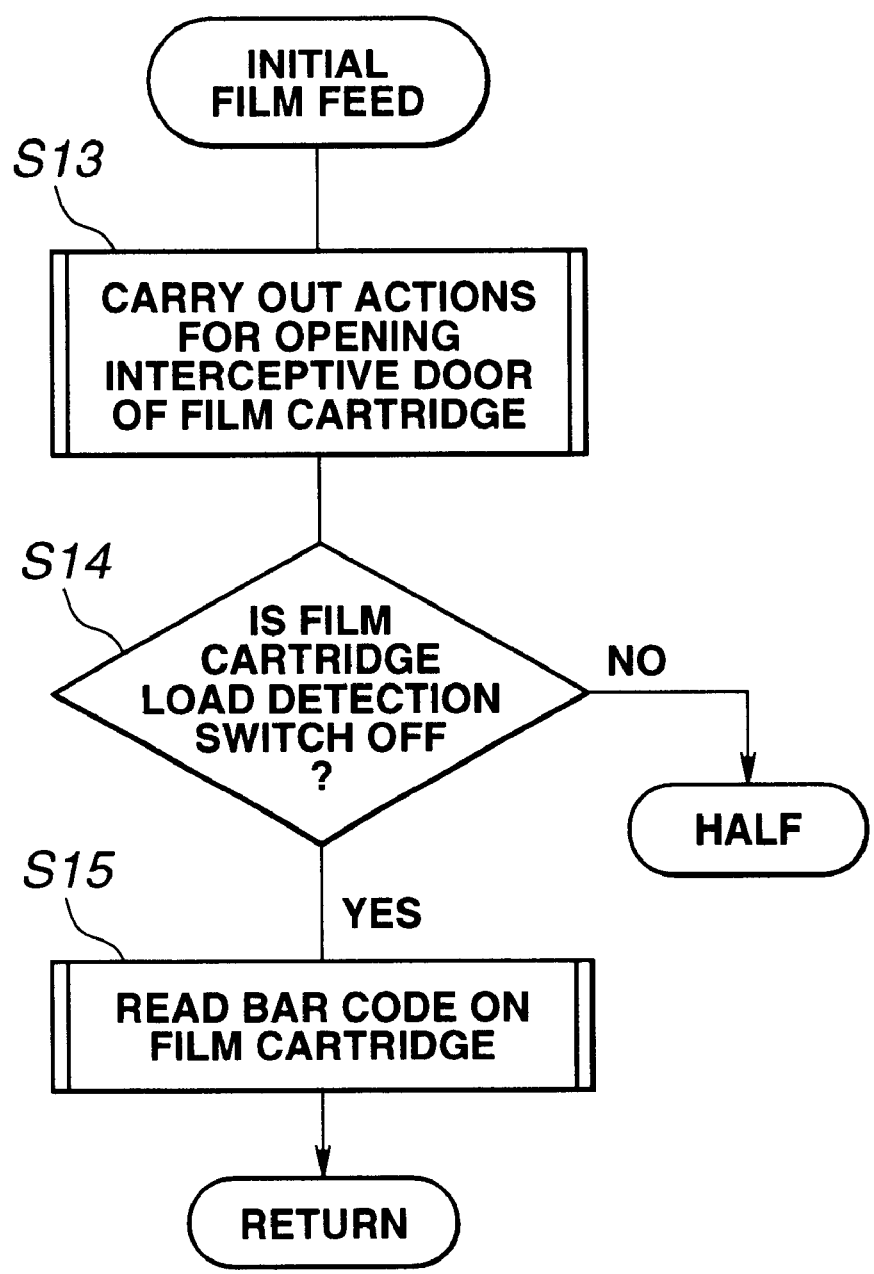
FIG. 13 is a flowchart describing a subroutine for the Initial Film Thrust Action as described with reference to FIG. 12.

Upon passing control to the subroutine Initial Film Thrust at step S12, at step S13 in FIG. 13, the actions for opening the interceptive door 102 of the film cartridge 100 are carried out so that a film in the film cartridge 100 can be fed smoothly. This subroutine is accompanied by the actions described below.

As noted before, the CPU 15 received an off-state signal from the lid close detection switch 31 and controls driving of the motor 12 by the motor driver 13. The CPU 15 thus fills the role of a driving control unit for controlling driving of the motor 12. The driving force exerted by the motor 12 is conveyed to the fork drive member 8 via a driving force conveying means (not shown). This causes the fork drive member 8 to turn in a counterclockwise direction as viewed in FIG. 4. The open/close fork member 7 is turned clockwise against the constraining force of the fork spring 10. Consequently, the interceptive door 102 of the film cartridge 100 starts moving (turning) to an open state.

Figure 5:
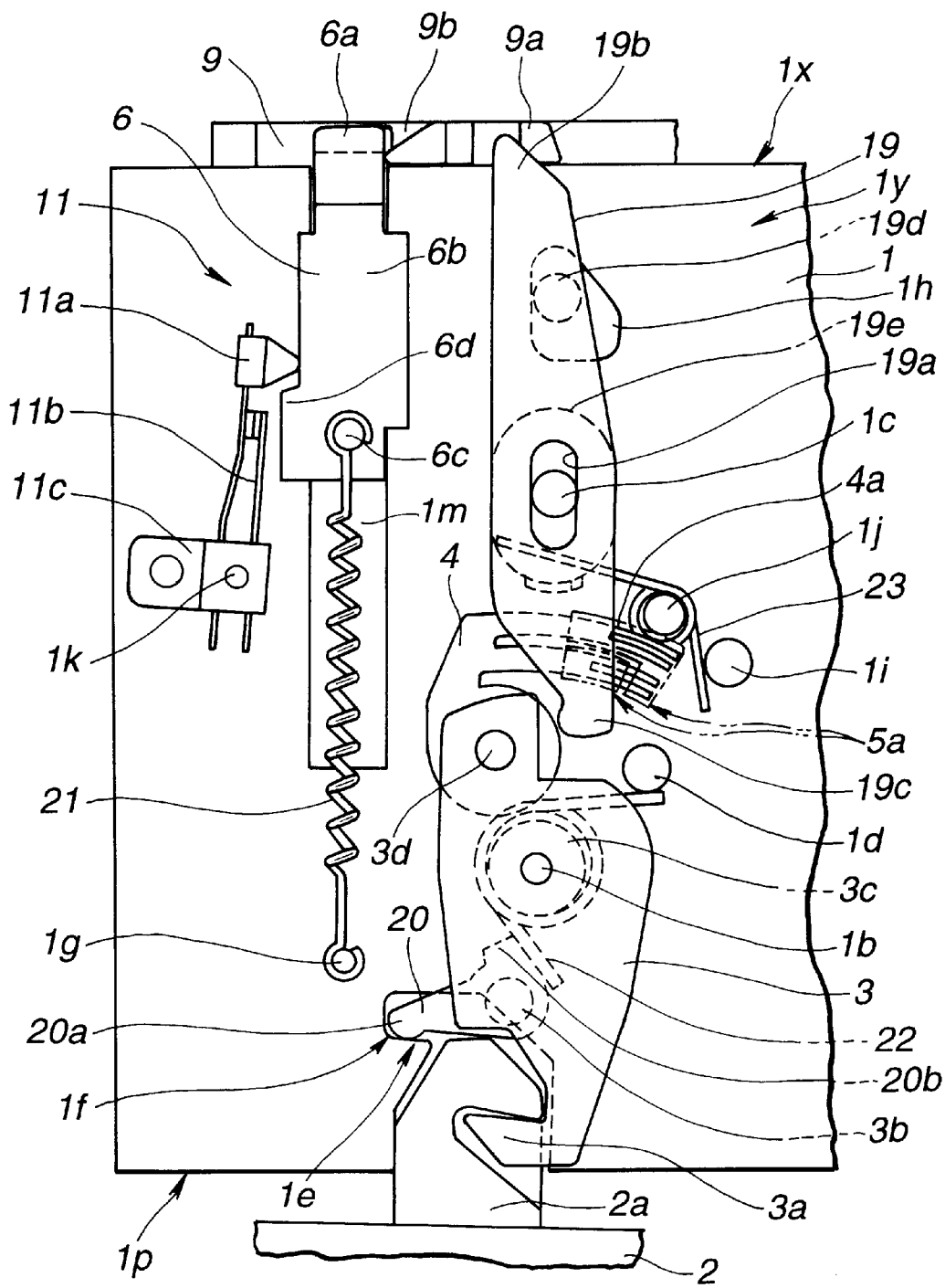
FIG. 5 is a front view showing the major portion of the film cartridge loader shown in FIG. 1, wherein a film cartridge has been loaded in the film cartridge chamber and the interceptive door of the film cartridge is being shifted to an open state.

At the same time, the gear portion 8c of the fork drive member 8 meshes with the gear portion 9e of the cam ring 9. This causes the cam ring 9 to turn clockwise. When the cam ring 9 turns, the arm portion 9a of the cam ring 9 abuts the tip of the arm portion 19b of the release lever 19, which extends slightly beyond the top 1x of the cartridge chamber 1 as shown in FIG. 5. The arm portion 9a of the cam ring 9 pushes down the arm portion 19b of the release lever 19 in the direction of arrow X2 against the constraining force of the constraining spring 23 as it passes the release lever 19 while turning.

After the arm portion 9a of the cam ring 9 has turned past this position, the release lever 19 is pushed back up in the direction of the arrow X1 due to the constraining force of the constraining spring 23. In this case, the position of the release lever 19 is restricted by the oblong hole 19a and guide pin 1c, and the guide hole 1h and guide pin 19d. Specifically, when the open/close fork member 7 turns to open the interceptive door 102 of the film cartridge 100, the fork drive member 8 turns counterclockwise. When the cam ring 9 turns clockwise, the cam ring 9 shifts from the state shown in FIG. 4 and FIG. 5 to the state shown in FIG. 6 and FIG. 7. At this time, movement of the arm portion 9a of the cam ring 9 operates to push the arm portion 19b of the release lever 19 down in the direction of arrow X2 and also to cause the arm portion 19b to move in the direction of arrow X1 due to the constraining force. However, it is noted that the release lever 19 itself does not operate on any other member.

Figure 4:
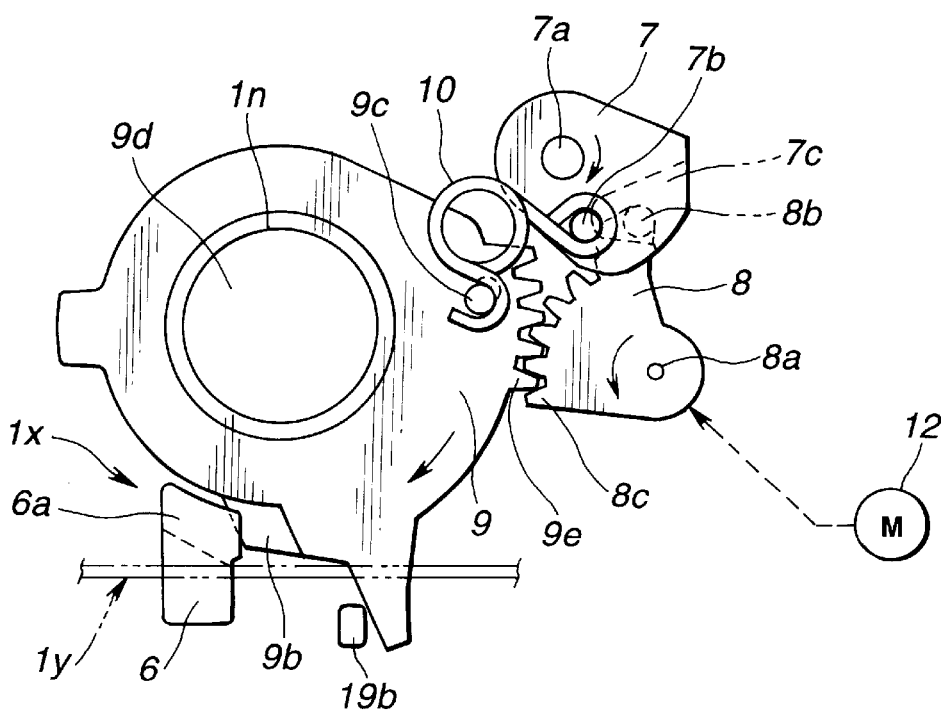
FIG. 4 is a top view of the film cartridge interceptive door opening/closing means and integral parts of the film cartridge loader shown in FIG. 1 as viewed from above the film cartridge chamber, wherein a film cartridge has been loaded in the film cartridge chamber and the interceptive door of the film cartridge is being shifted to an open state.

Thereafter, as shown in FIG. 9, the inclined plane 9b of the cam ring 9 enters the gap S created with the ejection member 6 above the cartridge chamber 1 (see FIG. 4). With the turn made by the cam ring 9, the inclined plane 9b pushes up the ejection member 6 in the direction of arrow X1. Consequently, the ejection member 6 enters the state shown in FIG. 7 and FIG. 10. As mentioned above, the switching state of the cartridge load detection switch 11 is changed (the switch is turned off). In this state, the film cartridge 100 has been fully loaded in the cartridge chamber 1.

Control is then passed from the subroutine of step S13 in FIG. 13 to step S14. At step S14, the CPU 15 checks if the cartridge load detection switch 11 is open or closed. If it is confirmed that the switch 11 is on, it is judged that an abnormality has occurred, whereupon any sequence of actions which would otherwise be performed in the normal operation of the camera or the sequence Initial File Thrust is suspended (halted).

In contrast, if it is confirmed at step S14 that the cartridge load detection switch 11 is off, control is next passed to the step S15. As described below, after a subroutine Film Cartridge Bar Code Read is executed, a series of steps is completed and control is returned to the main routine described with reference to FIG. 12.

The subroutine Film Cartridge Bar Code Read of step S15 is executed by carrying out a sequence of actions. Specifically, the information reading means 18 is controlled by the CPU 15 to read various types of information from the bar code plate 104 (see FIG. 16) of the film cartridge 100 loaded in the cartridge chamber 1. The various types of information are information inherent to the film stowed in the film cartridge 100. The sequence of actions is to be generally performed in a camera compatible with the novel camera system. The details of this sequence of actions will therefore be omitted in this specification.

Additionally, a subsequent sequence of actions to be performed at step S11 in FIG. 12 when the signal sent from the lid close detection switch 31 is not an off-state signal has no direct relation to the present invention. Thus, the details of this sequence of actions and associated drawings will also be omitted.

When a camera having the film cartridge loader of this embodiment is used to carry out photography, the main routine includes, as described at step S16 in FIG. 12, a step of monitoring a change in the switching state of the chamber lid open switch 16.

Specifically, such a change may occur when the camera is in use, for example, and a specified number of frames of a film stowed in the loaded film cartridge 100 may have been fully exposed, whereupon the loaded film cartridge 100 may have to be replaced with another one. In this case, manipulations may be performed in order to start halfway rewinding actions for rewinding a film, which has been exposed halfway, into the film cartridge 100 when the chamber lid 2 is opened by mistake. In any event, if manipulations are performed for extracting the film cartridge 100 from the cartridge chamber 1, the chamber lid open switch 16 is turned on.

In practice, the chamber lid open switch 16 is turned on in the cases described below. For example, the chamber lid open switch 16 is automatically turned on responsively to a series of film feeding actions to be carried out after exposure of a last frame is completed. Also, when the halfway rewinding switch is manipulated, or when the release button or the like for opening the chamber lid 2 is manipulated, the chamber lid open switch 16 is turned on.

At step S16 in FIG. 12, the CPU 15 monitors changes in the switching state of the chamber lid open switch 16. If it is confirmed that the switch 16 is turned on, control is passed to step S17. At step S17, the CPU 15 causes the film rewinding motor (for example, the motor 12) to turn inversely (in a direction in which a film is rewound), and carries out film rewinding actions.

When the film rewinding actions are completed, a signal is produced by the rewind end detection switch 32. In response to the signal, the CPU 15 controls the driving of the motor 12 by the motor driver 13. The fork drive member 8 is turned clockwise as viewed in FIG. 6 by the driving force exerted by the motor 12. This causes the open/close fork member 7 to turn counterclockwise against the constraining force exerted by the fork spring 10, thus causing the interceptive door 102 of the film cartridge 100 to start moving (turning) to the closed state.

At the same time, the gear portion 8c of the fork drive member 8 turns the cam ring 9 counterclockwise. The inclined plane 9b of the cam ring then separates from the gap S (see FIG. 9) created by the ejection member 6 and the top 1x. This causes the ejection member 6 to move in the direction of arrow X2 due to the constraining force of the constraining spring 21. The switching state of the cartridge load detection switch 11 is changed (i.e., the switch is turned on).

Moreover, the arm portion 9a of the cam ring 9 abuts the tip of the arm portion 19b of the release lever 19, and turns the arm portion 19b thereof clockwise with the guide pin 1c as a center. At this time, since the guide pin 19d is positioned in the guide hole 1h, the guide pin 19d moves along the inner circumference of the guide hole 1h. Consequently, the release lever 19 moves (in the direction of arrow X2) along the oblong hole 19a against the constraining force of the constraining spring 23 while turning clockwise with the guide pin 1c as a center.

The tip of the other end 19c of the release lever abuts on the distal part of the lock lever 3, and turns the lever 3 counterclockwise against the constraining force of the constraining spring 22. Consequently, the lock portion 2a and hook portion 3a are unlocked. At this time, the electrical contact 4a and switch pattern 5a part from each other. A signal is generated to indicate that the chamber lid 2 is opened (an on-state signal is produced by the lid close detecting means).

Figure 6:
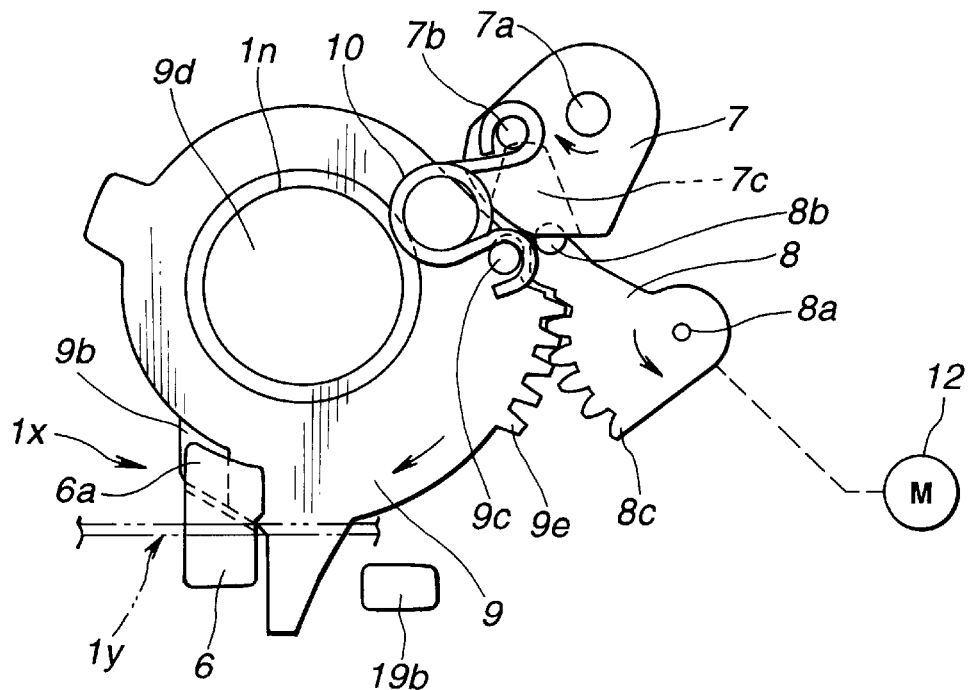
FIG. 6 is a top view of the film cartridge interceptive door opening/closing means and integral parts of the film cartridge loader shown in FIG. 1 as viewed from above the film cartridge chamber, wherein a film cartridge has been fully loaded in the film cartridge chamber and the interceptive door is open such that film feeding actions can be initiated.
Figure 7:
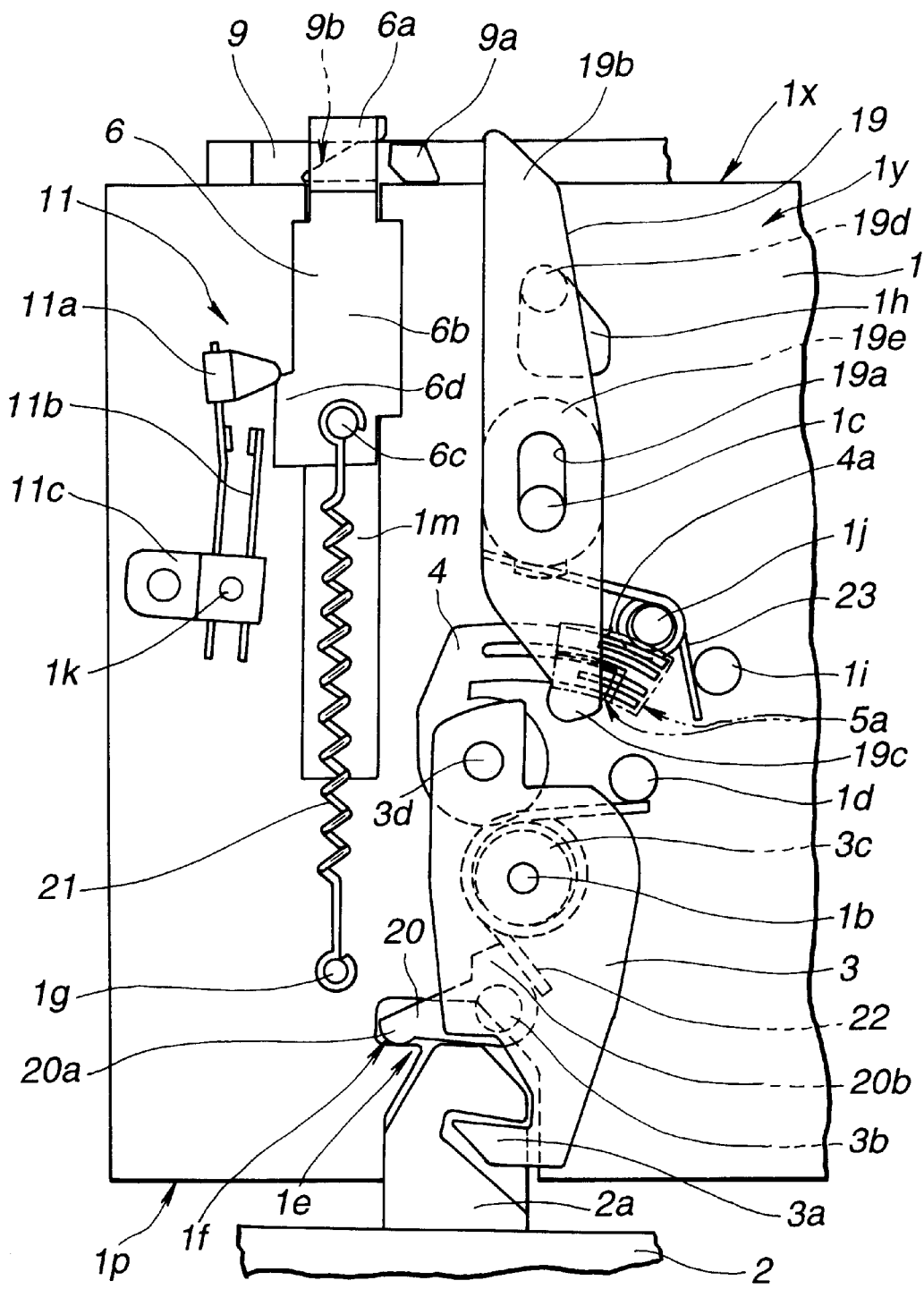
FIG. 7 is a front view showing the major portion of the film cartridge loader shown in FIG. 1, wherein a film cartridge has been fully loaded in the film cartridge chamber and the interceptive door is open such that the film feeding actions can be initiated.

In other words, the foregoing actions are carried out to change the state shown in FIG. 6 and FIG. 7 to the state shown in FIG. 2 and FIG. 3 through the state shown in FIG. 4 and FIG. 5.

At step S18 in FIG. 12, the CPU 15 checks the switching state of the lid close detection switch 31. In response to an on-state signal sent from the lid close detection switch 31, the CPU 15 instructs the motor driving to halt rotation or driving of the motor 12 (i.e., it turns off the motor).

As described above, the chamber lid open switch 16 includes a chamber lid release switch, a halfway rewind switch, and a last frame detection switch. The chamber lid release switch is interlocked with a release button or the like. Similarly, the halfway rewind switch is interlocked with a halfway rewind button or the like. Finally, the last frame detection switch is interlocked with an automatic film rewinding means.

Figure 14:
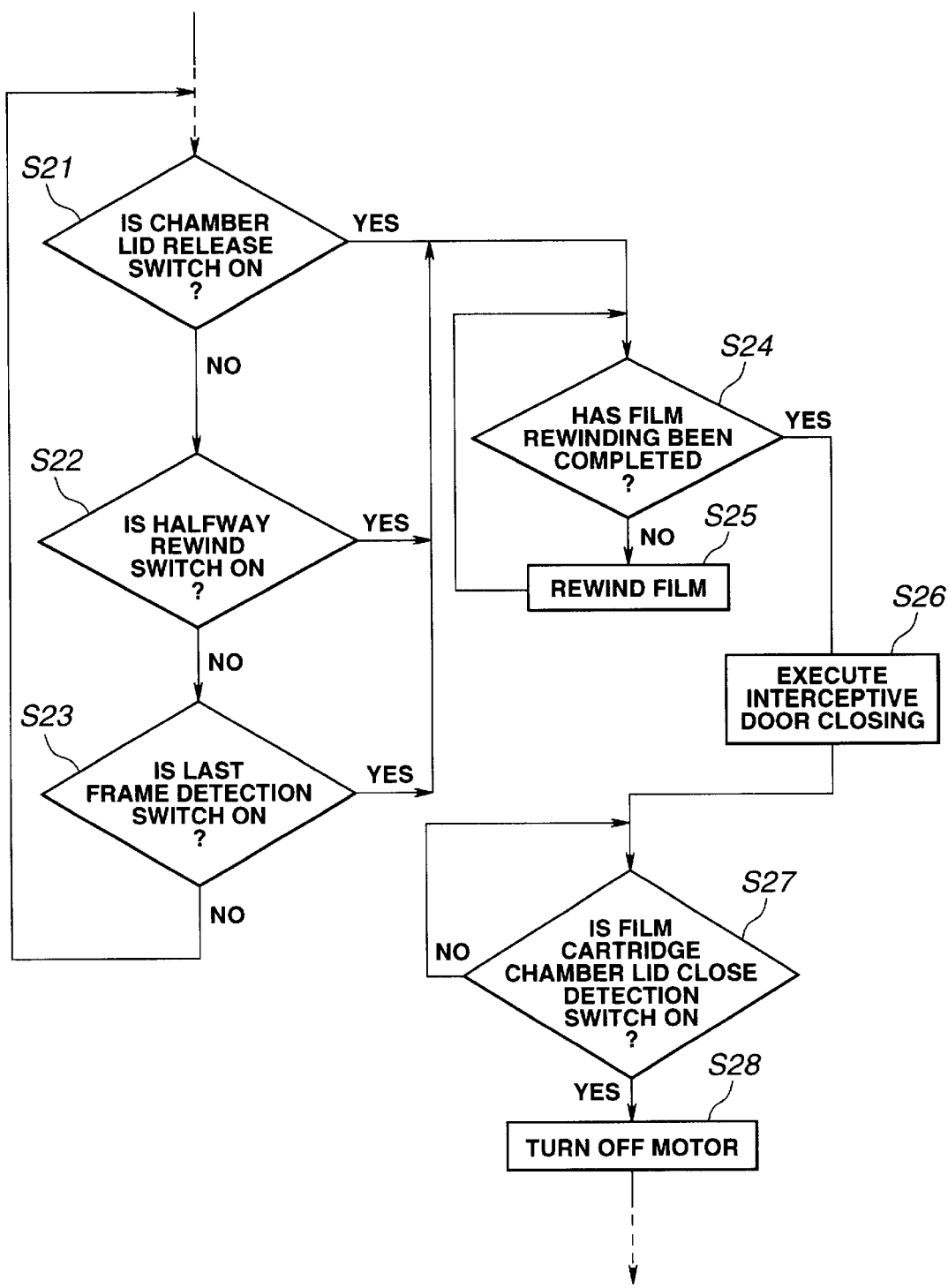
FIG. 14 is a flowchart describing a sequence of actions for opening the film cartridge chamber lid in the film cartridge loader shown in FIG. 1.

In the film cartridge loader of this embodiment, when any of the switches serving as the chamber lid open switch 16 is turned on, opening of the chamber lid 2 is permitted. FIG. 14 is a flowchart describing an exemplary sequence for demonstrating the operation of chamber lid open switch 16.

At steps S21, S22, and S23 in FIG. 14, the CPU 15 monitors the state of the chamber lid release switch, halfway rewind switch, or last frame detection switch serving as the chamber lid open switch 16. In response to a command signal produced when any of the switches is turned on, control is passed to step S24.

At step S24, a signal sent from the rewind end detection switch 32 is sensed to determine if film rewinding has terminated. If film rewinding has not terminated, the rewinding process is executed at step S25.

If it is confirmed that film rewinding has terminated, control is passed to step S26. At step S26, the CPU 15 controls driving of the motor 12 by the motor driver 13. The interceptive door 102 of the film cartridge 100 is closed using the driving force exerted by the motor 12.

Thereafter, the CPU 15 checks the state of the film cartridge chamber lid close detection switch 31 (step S27). In response to an on-state signal sent from the lid close detection switch 31, the CPU 15 instructs the motor driver to halt the driving of the motor 12 (i.e., it turns off the motor 12) (step S28).

As mentioned above, according to the present invention, several actions are performed for loading a film cartridge 100 having an interceptive door 102 into the film cartridge chamber 1. Additional actions are performed to close the opening 1p of the film cartridge chamber 1 and still further actions are performed for opening the interceptive door 102 of the film cartridge 100 after it is fully loaded in the film cartridge chamber 1. These three sets of actions are interlocked with one another and are controlled as a series of film loading actions. This results in a film cartridge loader for a camera capable of reliably intercepting light from entering the interior of the film cartridge 100 and ensuring smoother and more reliable film feeding actions.

Moreover, upon confirmation that the film cartridge 100 has been loaded in the cartridge chamber 1, initial film thrusting actions will be carried out. If the film cartridge 100 is not loaded in the film cartridge chamber 1, the film feeding actions will not be carried out. Consequently, unnecessary power consumption can be minimized to contribute to the saving of power.

Furthermore, even after the chamber lid 2 is closed, initial film thrusting actions are not carried out until the interceptive door 102 of the film cartridge 100 is opened. Consequently, automatic film feeding actions can be carried out reliably and smoothly.

In this embodiment, before the film cartridge 100 is loaded, one end of the fork spring 10 is, as apparent from FIG. 2, locked by the pin 9c of the cam ring 9. The cam ring 9 may be seen as poised to turn clockwise. However, since the fork drive member 8 and motor 12 are coupled to each other by a gear train, the cam ring 9 will not turn readily due to the high gear ratio.

Moreover, the pin 9c may be fixed to a solid-state entity (not shown) in a camera body instead of the cam ring 9.

In the foregoing embodiment, the chamber lid close switch 16 is turned on in several situations, for example, after the last frame of a film is exposed and a series of film feeding actions is carried out. Other situations in which the chamber lid close switch 16 is turned on include when either the halfway rewind switch or the release button or the like is manipulated in order to open the chamber lid 2.

Figure 15:
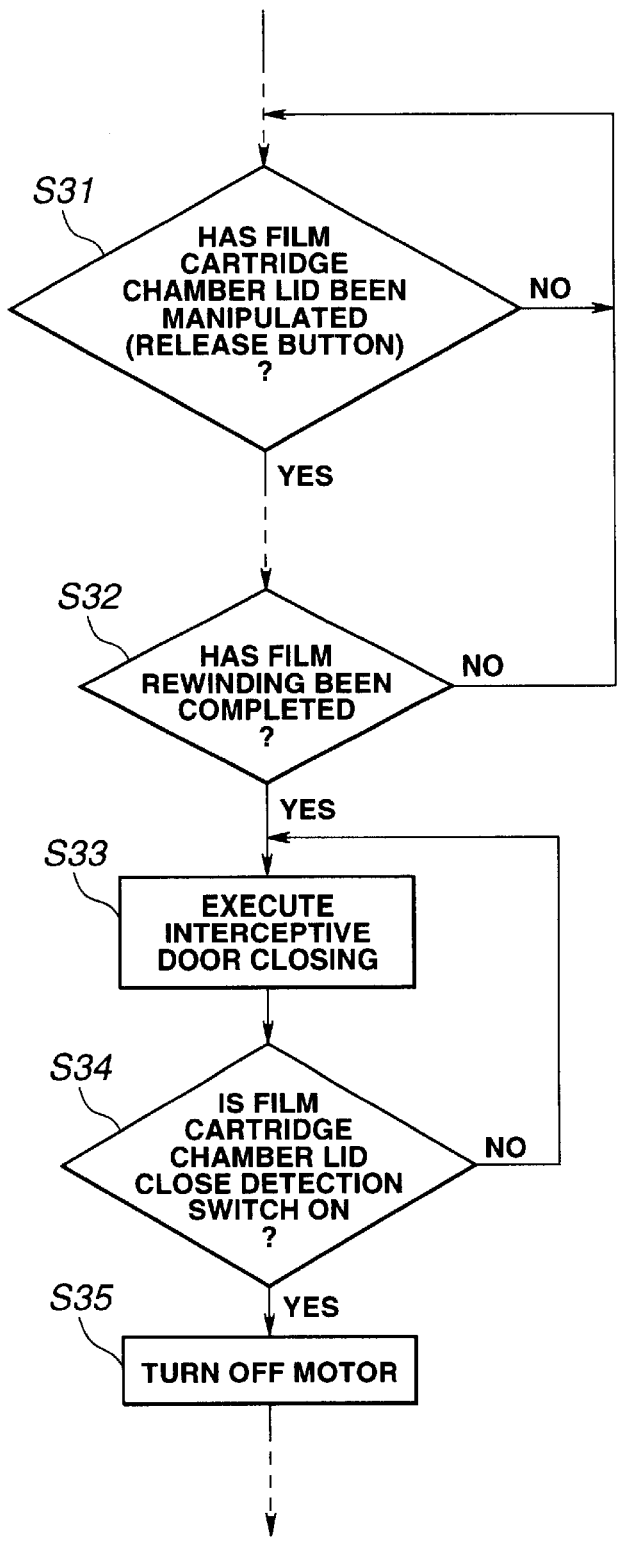
FIG. 15 is a flowchart describing another exemplary part of a sequence of actions (main routine), which is carried out in a camera in which the film cartridge loader shown in FIG. 1 is incorporated.

Control in the camera with respect to the chamber lid open switch 16 feature is executed according to the flowchart of FIG. 15. Specifically, only when predetermined manipulations are performed is the chamber lid 2 permitted to open.

For example, as shown in FIG. 15, a check is performed to determine whether the release button or the like has been manipulated for opening the chamber lid 2 (step S31). Thereafter, based on a signal sent from the rewind end detection switch 32 (see FIG. 11) a check is performed to determine if film rewinding actions have been completed (step S32). If the film rewinding actions have not been completed, the actions for opening the chamber lid 2 are inhibited. Consequently, light harmful to the film can be reliably prevented from entering the film cartridge.

On the other hand, when it is confirmed based on a signal sent from the rewind end detection switch 32 that film rewinding actions have been completed, the CPU 15 executes the process for closing the interceptive door 102 of the film cartridge 100 using the driving force exerted by the motor 12 (step S33) which is also driven under control of the CPU 15.

Thereafter, the CPU 15 checks the state of the film cartridge chamber lid close detection switch 31 (step S34). In response to an on-state signal sent from the lid close detection switch 31, the CPU 15 instructs the motor driver to halt the driving of the motor 12 (i.e., it turns off the motor) (step S35).

Only when a camera user performs manipulations to intentionally open the chamber lid 2, actions are permitted for opening the chamber lid 2.

As mentioned above, the sequence for opening the chamber lid 2 can be selected in conformity with the specifications of a camera in which a film cartridge loader of the present invention is incorporated. Alternatively, a plurality of sequences may be executed selectively so that each user can select any of the sequences according to his/her preference.

In the present invention, it is apparent that a wide range of different embodiments can be formed based on the invention as disclosed herein without departing from the spirit and scope of the invention. This invention is therefore limited only by the appended claims and is not restricted by any specific embodiments as discussed by way of example herein.

What is claimed is:

1. A film cartridge loader for a camera, comprising:
   a film cartridge chamber having an opening through which a film cartridge having an interceptive door is receivable into an interior of said film cartridge chamber;
   an interceptive door open/close member drivable to open or close an interceptive door of a film cartridge;
   a first member moveable in conjunction with said interceptive door open/close member;
   a second member shiftable from a first position where it is not engageable with said first member to a second position where it is engageable with said first member when a film cartridge is received into said film cartridge chamber, said second member being shiftable to a third position from said second position by said first member and also lockable by said first member in said third position when said interceptive door open/close member is driven in a direction to open said interceptive door; and
   a detection switch having a changeable switching state, said changeable switching state changing when said second member shifts to said third position from said second position to indicate that a film cartridge has been received in said film cartridge chamber.

2. A film cartridge loader for a camera according to claim 1, further comprising:
   a film cartridge chamber lid moveable to open or close said opening of said film cartridge chamber;
   a chamber lid open/close state detection member for detecting if the film cartridge chamber lid is open or closed;
   a motor for driving said interceptive door open/close member; and
   a driving control unit for controlling said motor to drive said interceptive door open/close member in a direction to open an interceptive door of a film cartridge received in said film cartridge chamber when said chamber lid open/close state detection member detects that said film cartridge chamber lid is closed.

3. A film cartridge loader for a camera according to claim 2, further comprising:
   a film feeding mechanism for feeding a film in a film cartridge received in said film cartridge chamber,
   wherein said driving control unit drives said film feeding mechanism to feed said film from said film cartridge in response to a change in said switching state of said detection switch when said interceptive door is driven in a direction to open, and said driving control unit does not drive said film feeding mechanism so that said film is not fed from said film cartridge when the switching state of said detection switch is not changed to drive said interceptive door in a direction to open.

4. A film cartridge loader for a camera according to claim 1, further comprising:
   a chamber lid lock member for locking said film cartridge chamber lid to retain the closed state of said film cartridge chamber lid; and
   a release member for releasing said film cartridge chamber lid that is locked by said chamber lid lock member,
   wherein said release member is displaced by said first member to release said film cartridge chamber lid that is locked by said chamber lid lock member when closing said interceptive door of said film cartridge received in said film cartridge chamber.

5. A film cartridge loader for a camera according to claim 4, further comprising:
   a chamber lid open switch having a changeable switching state for opening said film cartridge chamber lid; and
   a driving control unit for driving said interceptive door open/close member in a direction to close an interceptive door of a film cartridge received in said film cartridge chamber when said switching state of said chamber lid switch is changed.

6. A film cartridge loader for a camera according to claim 5, further comprising:
   a manipulation member manipulable to open said film cartridge chamber lid,
   wherein said switching state of said chamber lid open switch is changed when said manipulation switch is manipulated.

7. A film cartridge loader for a camera according to claim 5, further comprising:
   a sensor for sensing a predetermined number of exposures of a film in a film cartridge,
   wherein said switching state of said chamber lid open switch is changed when sensor senses that a predetermined number of exposures has been completed for a film in a film cartridge received in said film cartridge chamber.

8. A film cartridge loader for a camera according to claim 5, further comprising:
   a halfway rewind manipulation member manipulable to rewind a film into a film cartridge prior to a predetermined number of exposures of a film in a film cartridge received in said film cartridge chamber,
   wherein said switching state of said chamber lid open switch is changed when said halfway rewinding manipulation member is manipulated.

9. A film cartridge loader for a camera, comprising:
   a film cartridge chamber having an opening through which a film cartridge having an interceptive door is received into an interior of said film cartridge chamber;
   a film cartridge chamber lid moveable to open or to close said opening;
   a chamber lid open/closed state detection member to detect whether said film cartridge chamber lid is open or closed;
   an interceptive door open/close member for opening or closing an interceptive door of a film cartridge;
   a first member moveable in conjunction with said interceptive door open/close member;
   a second member shiftable from a first position where it is not engageable with said first member to a second position where it is engageable with said first member when a film cartridge is received into said film cartridge chamber, said second member being engageable with a film cartridge;
   a film cartridge loading detection switch for detecting a film cartridge in said film cartridge chamber, said switch having a changeable switching state;
   a driving source for driving said interceptive door open/close member; and
   a driving control unit for controlling said driving of said driving source to drive said interceptive door open/ close member in a direction to open said interceptive door of said film cartridge received in said film cartridge chamber when said chamber lid open/close state detection member detects that said film cartridge chamber lid is closed, wherein said second member is displaced from said second position to a third position by said first member to change said switching state of said film cartridge loading detection switch is changed to confirm that a film cartridge has been received in said film cartridge chamber when driving said interceptive door open/close member in a direction to open an interceptive door of a film cartridge received in said film cartridge chamber.

10. A film cartridge loader for a camera according to claim 9, further comprising:

a constraining spring for constraining said second member towards an opening of said film cartridge chamber, wherein said second member is pushed against a constraining force of said constraining member when a film cartridge is received in said film cartridge chamber to displace said second member from said first position to said second position, said constraining member applying a force against said second member when said second member is shifted from said second position to said third position by said first member.

11. A film cartridge loader for a camera according to claim 10, wherein said second member is locked by said first member when said second member is at said third position.

12. A film cartridge loader for a camera according to claim 11, further comprising:

a chamber lid lock member for locking said film cartridge chamber lid to retain the closed state of said film cartridge chamber lid; and a release member for releasing said film cartridge chamber lid that is locked by said chamber lid lock member, wherein said release member is displaced by said first member when closing an interceptive door of a film cartridge received in said film cartridge chamber, thereby releasing said film cartridge chamber lid that is locked by said chamber lid lock member.

13. A film cartridge loader for a camera according to claim 12, further comprising:

a chamber lid open switch for opening said film cartridge chamber lid, wherein said driving control unit drives said interceptive door open/close member in a direction to close an interceptive door of a film cartridge received in said film cartridge chamber when said switching state of said chamber lid open switch is changed.

14. A film cartridge loader for a camera according to claim 12, wherein said first member is displaced in conjunction with said interceptive door open/close member when closing an interceptive door of a film cartridge received in said film cartridge chamber, thereby releasing said second member that is locked by said first member, and allowing said constraining member to force said second member to eject said film cartridge from said opening of said film cartridge chamber.

15. A film cartridge loader for a camera according to claim 14, wherein said film cartridge chamber lid is pushed and opened by a film cartridge received in said film cartridge chamber by said constraining force of said constraining member when said film cartridge is ejected from said film cartridge chamber.

16. A film cartridge loader for a camera according to claim 9, wherein said second member cannot engage a film cartridge received in said film cartridge chamber when said second member is at said third position.

* * * * *